US009792903B2

(12) United States Patent
Kim et al.

(10) Patent No.: US 9,792,903 B2
(45) Date of Patent: *Oct. 17, 2017

(54) METHODS AND SYSTEMS FOR DETERMINING RANKING OF DIALOGUE STICKER BASED ON SITUATION AND PREFERENCE INFORMATION

(71) Applicant: NCsoft Corporation, Seoul (KR)

(72) Inventors: Taek Jin Kim, Seongnam (KR); Jay June Lee, Seoul (KR); Jungsun Jang, seoul (KR); Sehee Chung, Yongin (KR); Kyeong Jong Lee, Yongin (KR); Yeonsoo Lee, Seoul (KR)

(73) Assignee: NCSOFT CORPORATION, Seoul (KR)

( * ) Notice: Subject to any disclaimer, the term of this patent is extended or adjusted under 35 U.S.C. 154(b) by 49 days.

This patent is subject to a terminal disclaimer.

(21) Appl. No.: 14/799,570

(22) Filed: Jul. 14, 2015

(65) Prior Publication Data

US 2016/0210963 A1 Jul. 21, 2016

(30) Foreign Application Priority Data

Jan. 19, 2015 (KR) ........................ 10-2015-0008728

(51) Int. Cl.
*G06F 17/27* (2006.01)
*G10L 15/18* (2013.01)
*G10L 15/08* (2006.01)

(52) U.S. Cl.
CPC .... *G10L 15/1822* (2013.01); *G10L 2015/088* (2013.01)

(58) Field of Classification Search
CPC ... G06F 17/27; G06F 17/276; G10L 15/1822; H04L 51/32
(Continued)

(56) References Cited

U.S. PATENT DOCUMENTS 8,306,977 B1 * 11/2012 Gildfind .............. G06F 17/3064
707/734
8,458,278 B2 * 6/2013 Christie ............... G06Q 10/107
709/207

(Continued)

FOREIGN PATENT DOCUMENTS

KR 10-0751396 A 8/2007
KR 10-2011-0026218 A 3/2011
(Continued)

OTHER PUBLICATIONS

Yeon-Su Lee, et al. "A method for measuring Inter-Utterance Similarity Considering Various Linguistic Features," Korean Sound Conference, vol. 28, No. 1, pp. 61-69 (2009).
(Continued)

*Primary Examiner* — Olujimi Adesanya
(74) *Attorney, Agent, or Firm* — Patent Office of Dr. Chung Park

(57) ABSTRACT

Provided is a method of determining the ranking of dialogue stickers based on situation and preference information. The method includes: analyzing utterances between the first user terminal and the second user terminal and selecting a sticker candidate group to be recommended to the first user terminal; calculating an expression suitability based on the preference and situation information in regard to the selected sticker candidate group; and determining the ranking of stickers in the order of suitability and then recommending a higher ranked sticker to the first user terminal.

8 Claims, 15 Drawing Sheets

(58) Field of Classification Search
USPC .......................................................... 704/9
See application file for complete search history.

(56) References Cited

U.S. PATENT DOCUMENTS

| | | | | |
|---|---|---|---|---|
| 9,042,923 B1* | 5/2015 | Mirho | ..................... | H04W 4/14 |
| | | | | 455/412.1 |
| 2002/0077135 A1* | 6/2002 | Hyon | ................ | H04M 1/72544 |
| | | | | 455/466 |
| 2004/0018858 A1* | 1/2004 | Nelson | .............. | H04M 1/72547 |
| | | | | 455/566 |
| 2006/0122834 A1* | 6/2006 | Bennett | ............... | G10L 15/1822 |
| | | | | 704/256 |
| 2007/0073517 A1* | 3/2007 | Panje | ................ | H04M 1/72552 |
| | | | | 702/181 |
| 2008/0059570 A1* | 3/2008 | Bill | ........................ | G06Q 10/10 |
| | | | | 709/203 |
| 2009/0019117 A1* | 1/2009 | Bonforte | .............. | G06Q 10/107 |
| | | | | 709/206 |
| 2009/0061825 A1* | 3/2009 | Neelakantan | ..... | H04L 29/12292 |
| | | | | 455/412.1 |
| 2011/0222788 A1* | 9/2011 | Tsunokawa | ............. | G06F 17/27 |
| | | | | 382/229 |
| 2013/0151508 A1* | 6/2013 | Kurabayashi | ....... | G06F 17/2223 |
| | | | | 707/723 |
| 2013/0218914 A1* | 8/2013 | Stavrianou | ........ | G06F 17/30654 |
| | | | | 707/755 |
| 2013/0247078 A1* | 9/2013 | Nikankin | ......... | H04N 21/44204 |
| | | | | 725/13 |
| 2013/0297608 A1* | 11/2013 | Etoh | ................. | G06F 17/30035 |
| | | | | 707/737 |
| 2014/0156360 A1* | 6/2014 | Shalita | ............... | G06Q 30/0255 |
| | | | | 705/14.1 |
| 2014/0214409 A1* | 7/2014 | Leydon | ................. | G06F 3/0236 |
| | | | | 704/9 |
| 2015/0149925 A1* | 5/2015 | Weksler | ................ | H04L 51/063 |
| | | | | 715/752 |
| 2015/0286371 A1* | 10/2015 | Degani | ................. | G06F 17/274 |
| | | | | 705/14.64 |
| 2016/0132490 A1* | 5/2016 | Lee | ..................... | G06F 17/2785 |
| | | | | 704/9 |
| 2016/0210116 A1* | 7/2016 | Kim | ........................ | G06F 17/276 |
| 2016/0210117 A1* | 7/2016 | Kim | ........................ | G10L 15/26 |
| 2016/0210962 A1* | 7/2016 | Kim | ........................ | G06F 17/27 |

FOREIGN PATENT DOCUMENTS

| | | |
|---|---|---|
| KR | 10-2011-0026218 A1 | 3/2011 |
| KR | 10-2014-0102287 A | 8/2014 |
| KR | 10-2014-0105841 A | 9/2014 |

OTHER PUBLICATIONS

Gumwon Hong et al., "A Korean Mobile Conversational Agent System," Korea Computer Science Conference, vol. 13, Book 6, 2008.

Kim, Jun Hyun et al. "Automated Emotion Recommendation Module Based on Bigram-Signature Using Text Mining," Korean Computer Conference, pp. 1632-1634, 2014.

* cited by examiner

FIG. 4

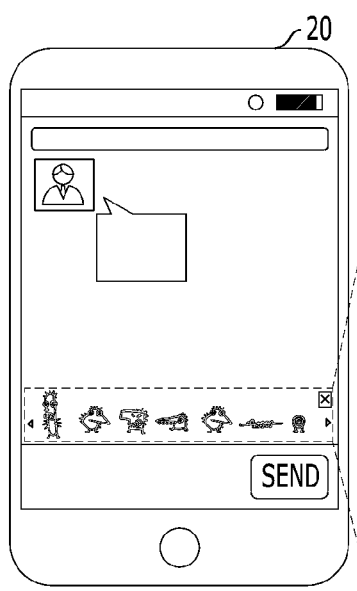

☐ RECOMMENDATION EXAMPLE #1:
  RELATION WITH THE OTHER PARTY
  ▫ WHEN THE OTHER PARTY IS A SUPERIOR

▫ WHEN THE OTHER PARTY IS A CLOSE FRIEND

☐ RECOMMENDATION EXAMPLE #2: DIALOGUE EMOTION
  WHEN A USER TALKS ABOUT HARD WORK TO A SUPERIOR

☐ RECOMMENDATION EXAMPLE #3: DIALOGUE SITUATION
  APPROPRIATE RESPONSE TO UTTERANCE OF THE
  OTHER PARTY WHEN FRIEND SAYS TO GIVE A TREAT

☐ RECOMMENDATION EXAMPLE #4: PERSONAL PREFERENCE
  USER WHO MAINLY USE STICKERS
  EXPRESSED AS OVERACTION

METHODS AND SYSTEMS FOR DETERMINING RANKING OF DIALOGUE STICKER BASED ON SITUATION AND PREFERENCE INFORMATION

CROSS-REFERENCE TO RELATED APPLICATIONS

This U.S. non-provisional patent application claims priority under 35 U.S.C. §119 of Korean Patent Application No. 10-2015-0008728, filed on Jan. 19, 2015, the entire contents of which are hereby incorporated by reference.

BACKGROUND OF THE INVENTION

The present invention disclosed herein relates to a method of recommending stickers during a dialogue through a social network service or an instant messenger, and more particularly, to a method of recommending a more appropriate sticker by determining the ranking of stickers based on situation and preference information when a sticker candidate group to be recommended is determined.

Emoticons are being used to express the emotional state of a user during a dialogue through a social network service or an instant messenger.

In the past, emoticons (e.g., OTL, TT, ^^;, etc.) written with texts was added to the end of the utterance, but in recent years, emoticons of graphic image types are being widely used. Hereinafter, the term "utterance" refers to at least one of text and image.

While inputting dialogue contents, a user opens an emoticon selection window and then selects and inputs an appropriate emoticon. In order to more conveniently perform the foregoing process, a technology of automatically converting and expressing a text inputted by a user into an emoticon has been also developed.

FIG. 1 is a view illustrating an emoticon displayed on a well-known personal computer messenger (NateOn).

In the well-known messenger shown in FIG. 1, when a specific keyword is inputted, the corresponding text is automatically converted into an emoticon corresponding to the specific keyword. In FIG. 1, when a user inputs a word "present", it can be seen that the word "present" is automatically converted into the emotion corresponding to the present.

However, when a specific keyword is simply inputted, this related art technology merely expresses an emoticon matched with the specific keyword in advance. Accordingly, in many cases, emoticons are expressed in regardless of dialogue contents or contexts, even in an inappropriate manner in the light of the dialogue situation.

PRIOR ART DOCUMENT

Patent Document

Document 1. Korean Patent Application Publication No. 10-2011-0026218 entitled "Apparatus and method for inputting text message and its program stored in recording medium"

Document 2. Korean Patent No. 10-0751396 entitled "System and method for auto conversion emoticon of SMS in mobile terminal"

Non-Patent Document

Document 3. Jun-Hyuk Kim, Young-Woong Park, Seul-Bi Ha, and Yong-Seok Choi, "Automated Emotion Recommendation Module Based on Bigram-Signature Using Text Mining", Korean Computer Conference, PP 1632-1634, 2014.

Document 4. Yeon-Su Lee, Joong-Hui Shin, Gum-Won Hong, Young-In Song, Do-Gil Lee, and Hae-Chang Rim, "A Method for Measuring Inter-Utterance Similarity Considering Various Linguistic Features", Korean Sound Conference, Vol. 28, No. 1, PP 61-69 (2009).

Document 5. GumWon Hong, Yeon-Soo Lee, Min-Jeong Kim, Seung-Wook Lee, Joo-Young Lee, and Hae-Chang Rim, "A Korean Mobile Conversational Agent System", Korea Computer Science Conference, Vol. 13, Book 6, 2008.

SUMMARY OF THE INVENTION

The present invention provides a method of understanding dialogue situation and emotion state by the unit of dialogue, not by the unit of utterance and selecting and recommending an appropriate sticker in consideration of context in a messenger or a social network service in which long-distance users exchange dialogues with each other.

The present invention also provides a method of recommending an appropriate sticker matching with a situation beyond simple keyword matching, by determining the ranking of stickers and recommending a higher-ranked sticker by scoring selected sticker candidates based on the relationship between dialogue parties, the situation-based expression suitability, and the preference of a user.

Embodiments of the present invention provide methods of recommending a dialogue sticker based on situation and preference information, include: by a server connected to a first user terminal and a second user terminal through a network, analyzing utterances between the first user terminal and the second user terminal and selecting a sticker candidate group to be recommended to the first user terminal; calculating an expression suitability based on the preference and situation information in regard to the selected sticker candidate group; and determining the ranking of stickers in the order of suitability and then recommending a higher ranked sticker to the first user terminal.

In some embodiments, the calculating of the expression suitability may include calculating a distance between an expression preference vector of a first user and an expression vector for each sticker in regard to each sticker of the selected sticker candidate group upon calculation of a preference-based expression suitability.

In other embodiments, the calculating of the expression suitability may include determining a similar situation to the utterances of the first user terminal and the second user terminal from a dialogue situation information database and calculating a distance between a sticker expression preference vector of the determined similar situation and expression vectors of each sticker of the selected sticker candidate group upon calculation of a situation-based expression suitability.

In still other embodiments, the expression preference vector may be one-dimensional vector having n vector elements, and each vector element may be a criterion for determining the preference for a sticker. For example, the vector element of the expression preference vector may include dynamic expression, complicated expression and exaggerated expression.

In even other embodiments, the expression vector for each sticker may be one-dimensional vector having the same vector elements as the expression preference vector, and may be assigned and stored with a predetermined value for each sticker.

In yet other embodiments, the calculating of the expression suitability may include inferring a relationship of a first user and a second user through analysis on utterances between the first user terminal and the second user terminal and correcting the expression suitability in accordance with the inferred relationship.

In further embodiments, when the intimacy between the first user and the second user is high, the dynamic expression, complicated expression or exaggerated expression suitability of the expression vector for each sticker may be corrected so as to increase.

In still further embodiments, when the relationship between the first user and the second user is a relationship between subordinates and superiors, the dynamic expression, complicated expression or exaggerated expression suitability of the expression vector for each sticker may be corrected so as to decrease.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 4 is a view illustrating examples of recommending stickers in consideration of relation with the other dialogue party, dialogue emotion, dialogue situation, and personal preference;

DETAILED DESCRIPTION OF PREFERRED EMBODIMENTS

Figure 1:
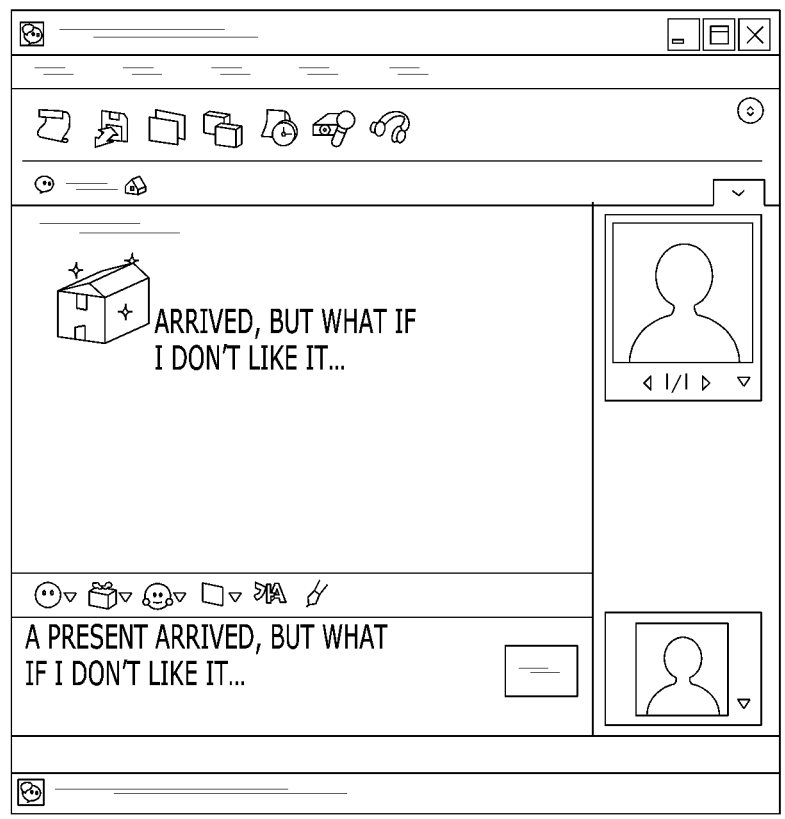
FIG. 1 is a view illustrating a typical automatic emoticon conversion technology.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, exemplary embodiments of the present invention will be described in detail with reference to the accompanying drawings. In order to clarify the present invention, a description irrelevant to the constitution of the present invention will be omitted, and in the drawings, like reference numerals refer to like elements throughout.

Since the terms "including", "comprising", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

In the detailed description of the invention and claims, components named as "~unit", "~part", "~module", and "~block" mean units that process at least one function or operation, and each of which can be implemented by software, hardware, or a combination thereof.

Hereinafter, a sticker denotes a graphic image attached to dialogue contents for use during a dialogue on a messenger or social network service. The sticker can be used interchangeably with an emoticon.

Hereinafter, an attached sticker denotes a sticker that accompanies a dialogue sentence inputted by a user and is attached to the inputted sentence.

Hereinafter, a responsive sticker denotes a sticker used to respond to a sticker used by the other party in the last dialogue or the last dialogue contents inputted by the other party.

The attached sticker may be a sticker recommended for a dialogue sentence inputted by the other party, and the responsive sticker may be a sticker recommended for a user (not the other party) in order to respond to a sticker used by the other party or the last dialogue sentence inputted by the other party.

Hereinafter, the attachment of a sticker denotes expressing the graphic image of the corresponding sticker at the front or rear of a dialog box or inputted dialogue contents or in the middle of the dialog box or inputted dialogue contents.

Hereinafter, an utterance denotes a basic unit of dialogue inputted by a user on a messenger or a social network service. Generally, the utterance may be performed by inputting dialogue contents in a form of text into a dialogue input window and then pushing a button "Send".

Hereinafter, a dialogue situation denotes a state flow of dialogue which emerges through the intention of utterance, emotion, and keyword analysis.

Hereinafter, a speech act denotes the intention of utterance.

Hereinafter, dialogue situation information, which is information obtained through dialogue act analysis, emotion analysis, and surface analysis on utterances, includes dialogue act information (information on dialogue act category), emotion information (information on emotion category and emotion strength), and keywords. The dialogue situation information may be generated from a single utterance, but preferably, may include dialogue act flow and emotion flow in regard to two or more continuous utterances.

Hereinafter, a dialogue situation information database denotes a database that stores a large amount of dialogue situation information through machine learning to dialogue act attachment corpuses and emotion attachment corpuses. The dialogue situation information database may include dialogue situation information on continuous utterances and pairs of utterance-sticker for each utterance.

Figure 2:
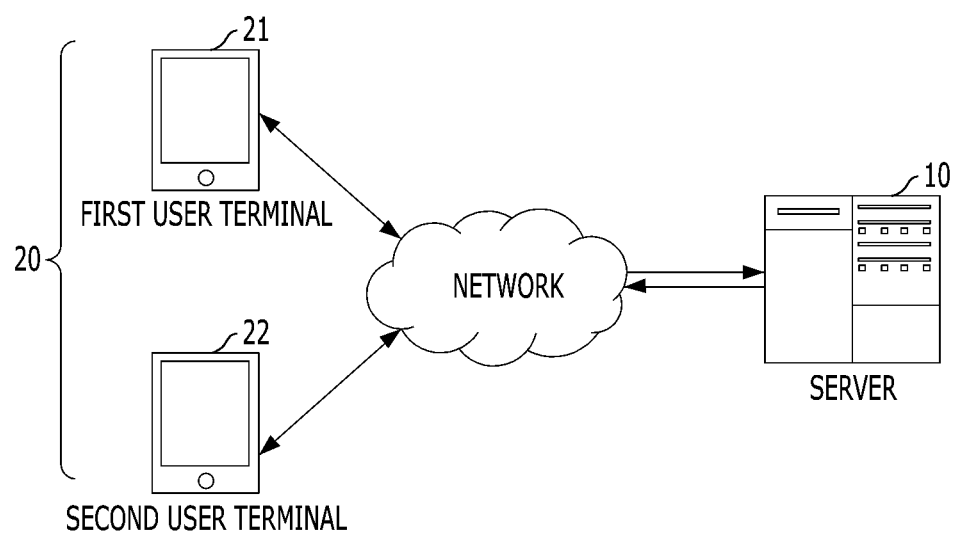
FIG. 2 is a view illustrating a relationship of a server and user terminals.

FIG. 2 is a view illustrating a relationship of a user terminal 20 and a server 10.

The user terminal 20 may be connected to the server 10 through a network, and may correspond to a unit for inputting dialogue contents or expressing an utterance inputted from the other party.

A user may exchange a visual form of messages including texts and images with other users via the server 10 using the user terminal 20.

Examples of the user terminal 20 may include smart phones and personal computers as the unit for performing the foregoing functions. In addition, units that can be connected to the network (e.g., Internet) and enable a visual type of communication for a user should be construed as being included in the user terminal 20.

Hereinafter, a first user may be in dialogue with the other party by exchanging messages with the other party, and a first user terminal 21 may correspond to a unit that enables the first user to perform the visual type of communication.

A second user may be the other part in dialogue with the first user, and a user terminal 22 may be a terminal used by the second user for dialogue.

The server 10 may relay messages between the first user and the second user, and furthermore, may recommend a responsive sticker to the first user such that the first user can conveniently respond to an utterance of the second user.

Hereinafter, it will be described that the server 10 recommends stickers to the first user, but this distinguishment between the first user and the second user is merely for better understanding as a matter of convenience. Accordingly, it is natural that the server 10 can recommend stickers to both users.

In FIG. 2, although only a single server is shown, a server group including a plurality of servers divided in accordance with functions thereof may be provided.

For example, the server 10 may also include a messenger server for relaying a dialogue between the first user terminal 21 and the second user terminal 22, a sticker recommendation server for analyzing a dialogue and recommending stickers, and a server for providing a social network service.

Also, the server 10 may be connected to an external social network service server in order to provide a sticker recommendation result for the user terminal 20 via the external server.

The responsive sticker recommendation method according to the embodiment of the present invention may be executed in the server 10 connected to the first user terminal 21 and the second user terminal 22 as described above.

Figure 3:
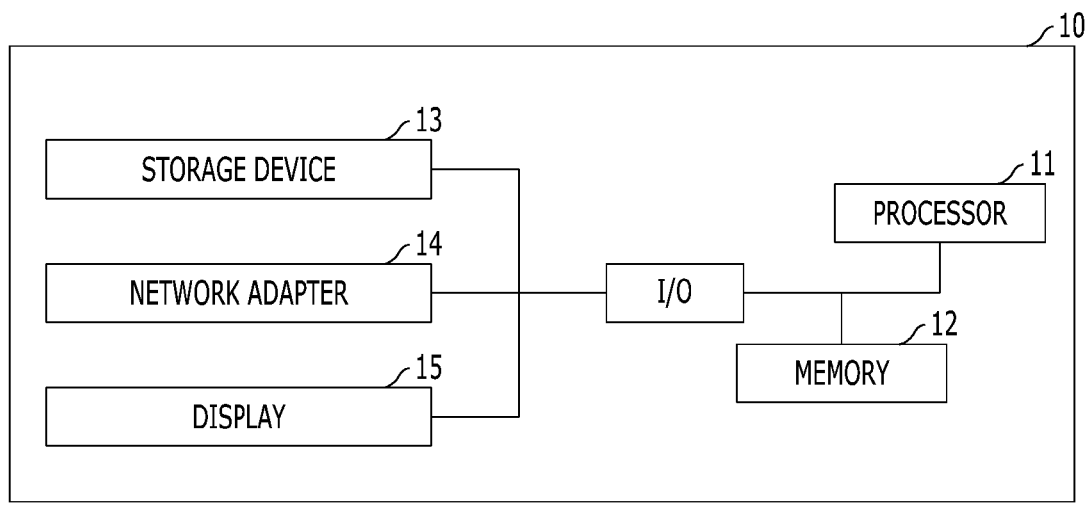
FIG. 3 is a view illustrating the configuration of a server.

FIG. 3 illustrates the hardware structure of the server.

As shown in FIG. 3, the server 10 may include a processor 11, a memory 12, a storage unit 13, and a network adapter 14.

The storage unit 13 may be loaded with already-analyzed utterance data and computer programs recorded with commands for executing the responsive sticker recommendation method of the present invention.

The memory 12 may correspond to a storage space for storing commands of the computer program, and the processor 11 may execute the commands loaded on the memory to execute the responsive sticker recommendation method of the present invention.

The network adapter 14 may communicate with the first user terminal 21 and the second user terminal 22 through wired/wireless communication methods.

The server 10 may select and recommend appropriate stickers during the dialogue of users through the following process.

First, the server 10 may collect dialogue contents from the first user terminal 21 and the second user terminal 20, and may analyze the dialogue situation by segmenting and analyzing an utterance.

Meanwhile, the server 10 may select an appropriate sticker candidate group by retrieving similar dialogue situations from utterance data which are already collected and analyzed using the established dialogue situation classification system and dialogue situation information, and may determine the ranking of stickers based on the situation and preference and finally recommend stickers to a user.

That is, unlike a related art in which one-to-one matching (recommending identical sticker in regard to identical keyword) is performed through simple comparison of keywords, even though identical keyword is checked from the parsing of dialogue contents, different stickers may be recommended in accordance with the dialogue situation, relation with the other party, or personal preference of a user.

FIG. 4 is a view illustrating examples of recommending, by the server 10, different sticker groups in accordance with the relation with the other party, dialogue emotion, dialogue situation, and personal preference in spite of identical dialogue contents.

In Example #1 of FIG. 4, when the other dialogue party is a superior or a close friend, it can be seen that different sticker groups are recommended.

In case of a superior, stickers giving an excessively unceremonious feeling may be excluded, and stickers appropriate for dialogue with a superior may be mainly recommended.

On the other hand, when the other party is a close friend, stickers that can be used conveniently instead of sticking to formality may be mainly recommended.

In Example #2 of FIG. 4, an appropriate sticker group may be recommended in accordance with the emotional state of a user.

When a user talks about hard and sad company works, the server 10 may catch the emotional state of a user, and may recommend a sticker group matching with the emotional state as shown in Example #2 of FIG. 3.

In Example #3 of FIG. 4, an appropriate sticker group may be recommended in accordance with the dialogue situation.

When the other dialogue party says to give a treat at the last inputted dialogue contents, stickers appropriate for the talk of the other dialogue party may be recommended as the dialogue contents of a user.

In Example #4 of FIG. 4, the ranking of selected sticker groups may be again determined and then recommended in accordance with the personal preference.

From the analysis of metadata of stickers that are much used at ordinary times by a user, if a user mainly use stickers expressed as overaction, then the server 10 may correct and provide a sticker group for the first user terminal 21 such that stickers expressed as overaction can be preferentially exposed among the sticker group selected in consideration of the dialogue situation, the relation with the other party, and the emotional state.

Figure 5:
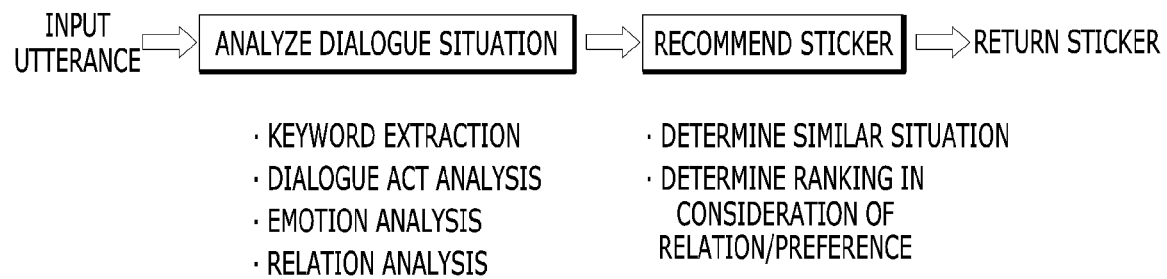
FIG. 5 is a view illustrating a process of recommending stickers by analyzing collected utterances.

As shown in FIG. 5, these series of sticker recommendation processes may be roughly divided into a dialogue situation analysis process and a sticker recommendation process.

FIG. 5 is a view illustrating a process of recommending stickers by analyzing collected utterances.

In the dialogue situation analysis process, through natural language processing, colloquial style of sentences may be corrected, and morphemes may be analyzed. Also, parts of speech may be attached. The correction of colloquial style of sentences, the analysis of morphemes, and the attachment of parts of speech may refer to well-known researches.

The dialogue act analysis and the emotion analysis may be performed using classified words and corpuses.

Also, the relationship between dialogue parties may be analyzed through the analysis on pairs of dialogues that are exchanged.

"Dialogue act", i.e., intention of utterance may be classified into various types from the general-purpose or social formality viewpoint of dialogue. For example, the intention may be classified into "praise", "help request", "greeting", and "boast".

"Emotion" may be divided into various categories according to the degree of emotion. For example, the emotion may be classified into categories such as "happiness" and "sadness", and may be divided in accordance with the degree of emotion such as "very", "normally", and "slightly".

"Relation" may be classified in accordance with the relationship between subordinates and superiors and the degree of intimacy. For example, the relation may be classified into "superior", "subordinate", "familiarity", and "unfamiliarity".

When the dialogue situation is analyzed through the foregoing process, the server 10 may retrieve the most similar dialogue situation from the dialogue situation information database in the sticker recommendation process.

The similar situation may be mainly determined based on the dialogue act flow (mainly defining context), and the emotion information or the user relationship may be overall considered.

Hereinafter, these series of processes will be described in detail with reference to the accompanying drawings.

First, in the dialogue situation analysis process, the server 10 may not analyze only a single utterance, but also may analyze the flow of two-way dialogue between dialogue parties.

The dialogue situation analysis process may be further divided into an utterance unit analysis process and a dialogue unit analysis process.

In the utterance analysis process, the analysis of vocabulary level may be performed regardless of the context.

In the utterance analysis process, colloquial style of sentences may be first corrected. In the correction of the colloquial style of sentences, word spacing, misspelling and slang may be corrected. Emoticons may be recognized to be converted into vocabularies corresponding thereto.

Meanwhile, morpheme analysis and attachment of parts of speech may be performed, and thus keywords may be extracted.

Thereafter, in the dialogue unit analysis process, dialogue act analysis, emotion analysis, and relation analysis may be performed. Thus, the server 10 may generate dialogue situation information.

In the dialogue unit analysis process, the analysis may be performed in consideration of the two-way dialogue context, not the utterance unit, and the situation classification system that is already constructed during the dialogue unit analysis may be used.

When an utterance is inputted, dialogue situation information on the corresponding utterance may be generated. The dialogue situation information may include a surface analysis result, a dialogue act analysis result and emotion analysis result on a certain number of continuous utterances including the last utterance between the first user terminal 21 and the second user terminal 22.

That is, in addition to the surface analysis result or the dialogue act analysis result on the last utterance itself that is a single utterance, the analysis results on a certain number of previous utterances exchanged between the first user and the second user may also be included.

For example, the analysis result on the last six utterances including the last utterance may be included, and the analysis results on all utterances between the first user and the second user may also be included.

The surface analysis result may include keywords and information on morphemes and parts of speech which are acquired through natural language processing on utterances.

The dialogue act analysis result may include dialogue act category (dialogue act information) values acquired through application of a dialogue act classification system.

The emotion analysis result may include emotion type and emotion strength information acquired through application of an emotion classification system.

Figure 6A:
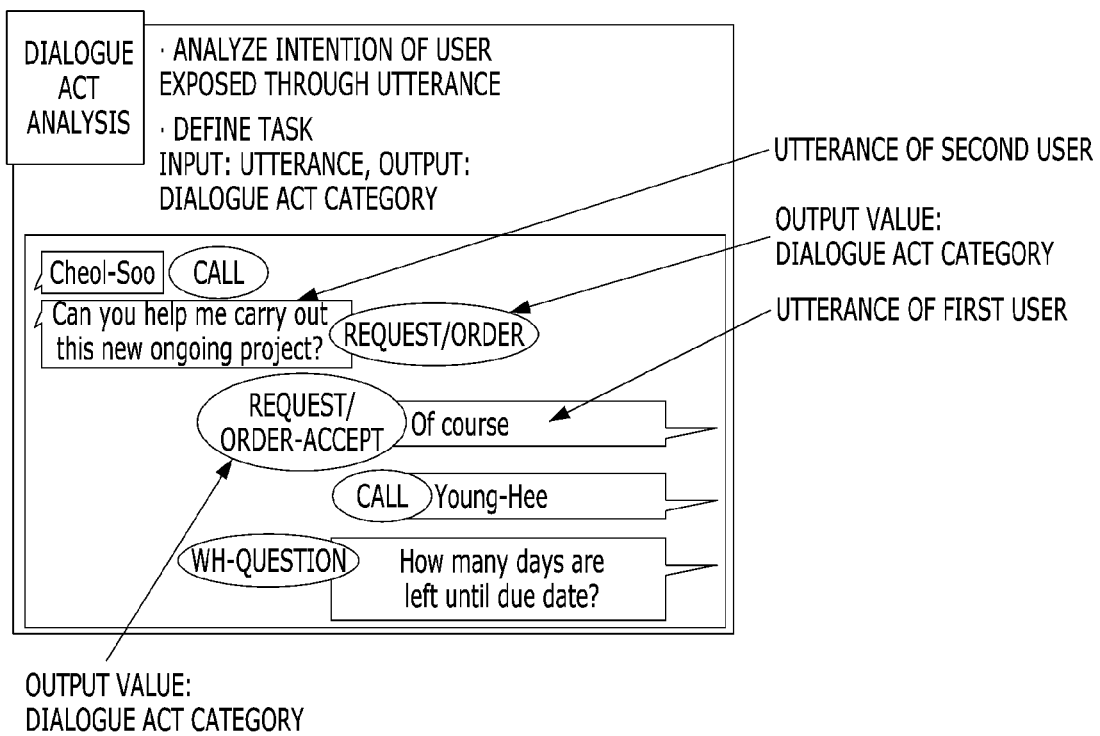
FIG. 6A to 6C are views illustrating dialogue act analysis, emotion analysis, and relation analysis, respectively.
Figure 6B:
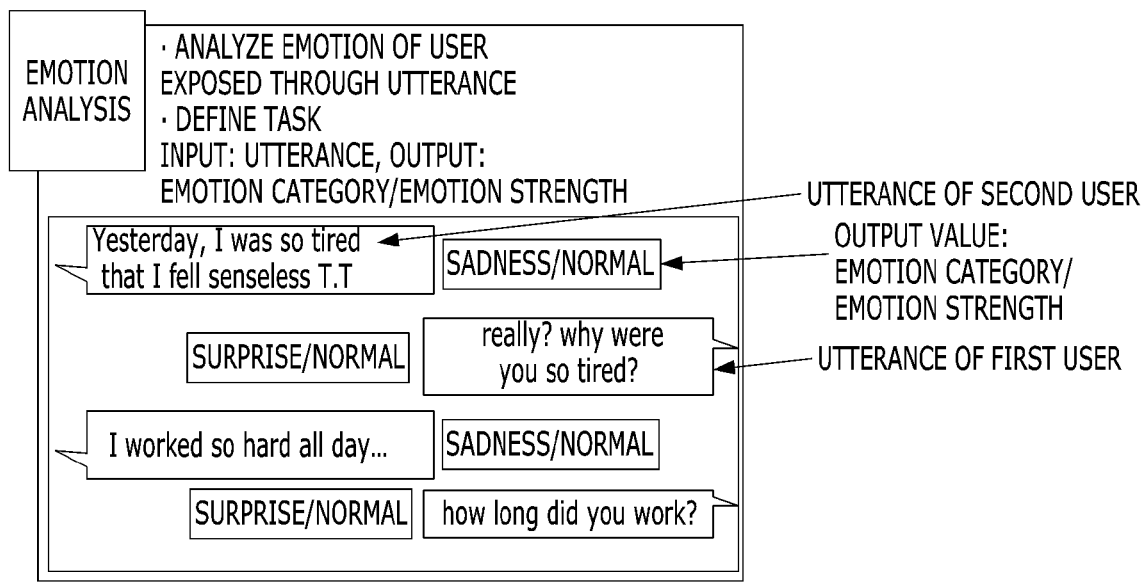
Figure 6C:
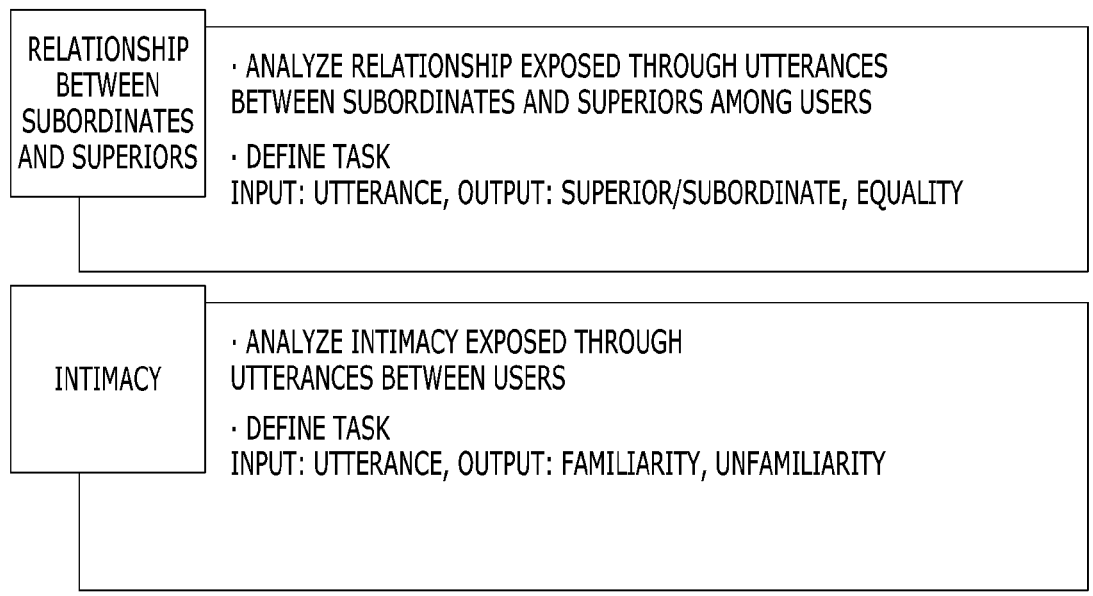

FIG. 6A to 6C are views illustrating dialogue act analysis, emotion analysis, and relation analysis, respectively.

As shown in FIG. 6A, the intention of a user, exposed through utterances, may be analyzed in the dialogue act analysis process.

The input value may be "utterance", and the output value may be "dialogue act category".

In FIG. 6A, when the first user inputs an utterance "Can you help me carry out this new ongoing project?", it can be seen that the output value corresponding thereto is "request/order" that is one of predefined dialogue act categories.

As shown in FIG. 6B, the emotion of a user, exposed through utterances, may be analyzed in the emotion analysis process.

The input value may be "utterance", and the output value may be "emotion category and emotion degree".

In FIG. 6B, when the first user inputs an utterance "Yesterday, I was so tired that I fell senseless. TT", it can be seen that the output value corresponding thereto is "sadness" and "normal". That is, the emotion category may be analyzed as "sadness", and the emotion degree may be analyzed as "normal".

As shown in FIG. 6C, the relationship between subordinates and superiors and the intimacy between users, which are exposed through utterances, may be analyzed in the relation analysis process.

The input value may be "utterance", and the output value of the analysis result on the relationship between subordinates and superiors may be "subordinates and superiors" or "equality". The output value of the analysis result on the intimacy may be "familiarity" or "unfamiliarity".

The dialogue situation classification system may be used for the dialogue act analysis or the emotion analysis.

The dialogue situation classification system may be divided into a dialogue act classification system and an emotion classification system.

The dialogue act classification system may be obtained by classifying the dialogue act, i.e., intention of dialogue into various types from the general-purpose or social formality viewpoint of dialogue.

Figure 7:
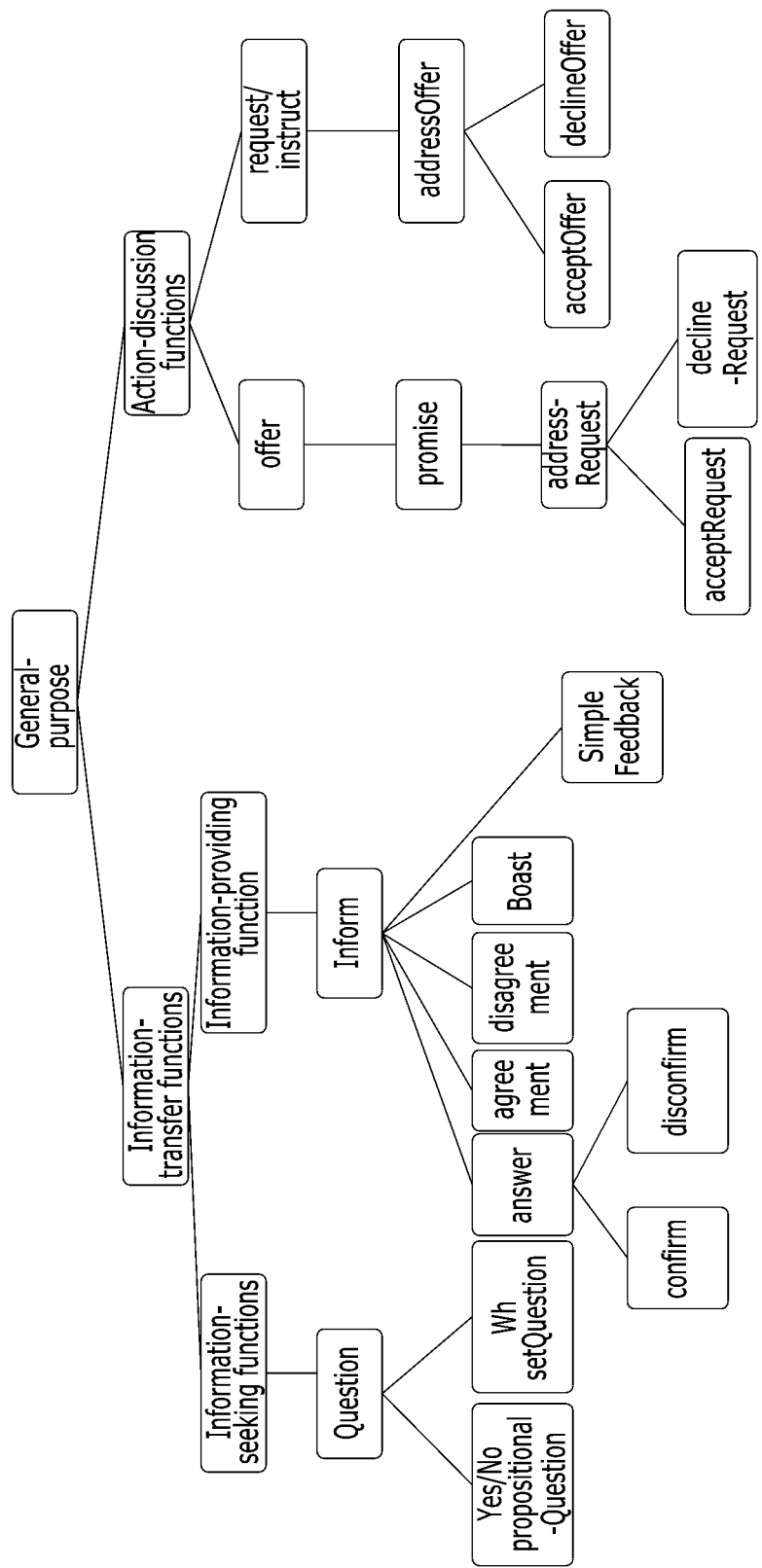
FIG. 7 is a view illustrating a classification system of dialogue acts from the general-purpose viewpoint of dialogue.

FIG. 7 is a view illustrating a classification system of dialogue acts from the general-purpose viewpoint of dialogue.

As shown in FIG. 7, the types such as "Yes-No question", "Wh-question", "Answer-confirm", "Answer-disconfirm", "Agreement", "Disagreement", and "Boast" may be shown.

In FIG. 7, the dialogue act classification system may reflect the hierarchical structure and the classification standards of ISO standard classification system, and may be established so as to comply with Korean language dialogue intention classification. The classification corresponding to emotion may be removed from the dialogue act classification system.

Figure 8:
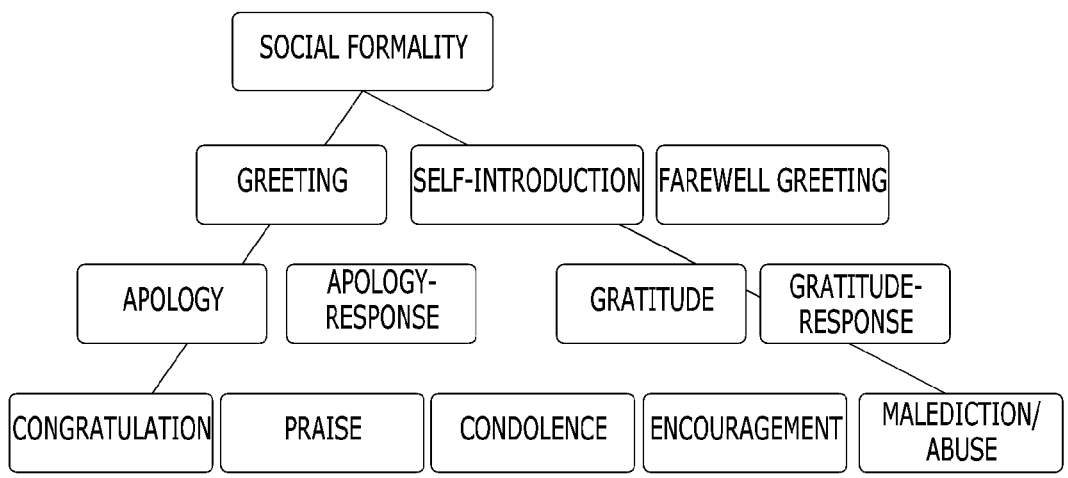
FIG. 8 is a view illustrating a classification system of dialogue acts from the viewpoint of social formality.

The dialogue act classification system of FIG. 8 may be a separate classification system obtained by considering factors of the dialogue attitudes frequently emerging in a messenger service, in addition to the dialogue general-purpose classification system of FIG. 7.

In FIG. 8, the factors of the dialogue attitudes may include "greeting", "apology", "gratitude", "congratulation", "condolence", "encouragement", and "malediction".

The dialogue act classification system of FIG. 7 may correspond to a classification system of modalities of dialogue.

Figure 9:
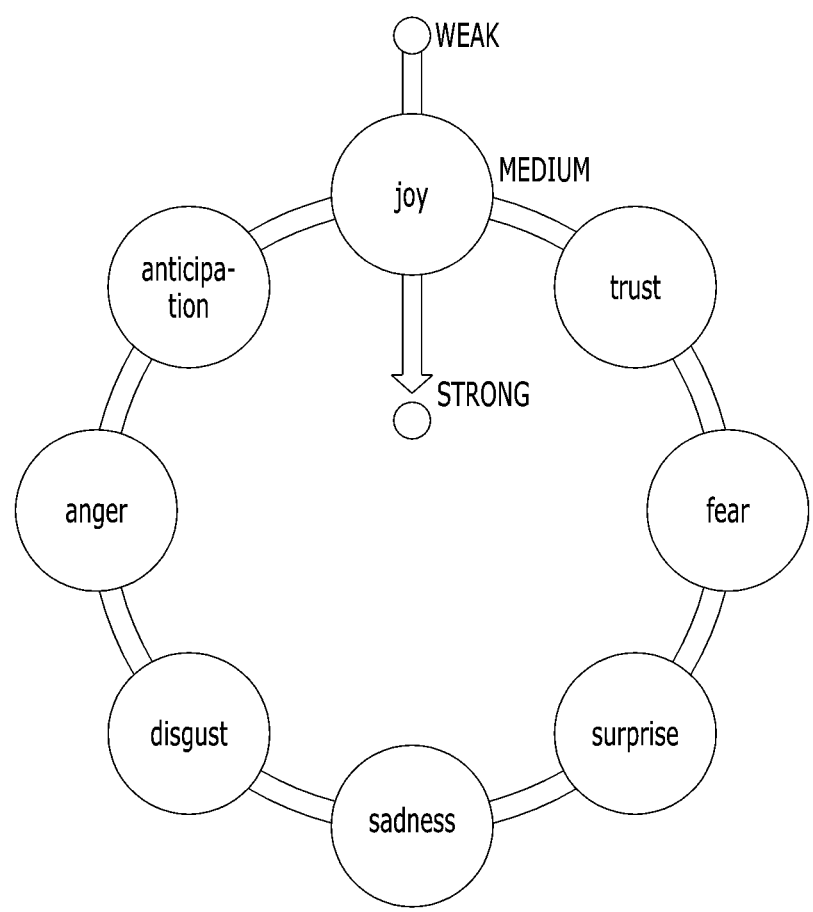
FIG. 9 is a view illustrating a classification system of emotion according to type and degree.

FIG. 9 is a view illustrating a classification system of emotion according to type and degree.

The emotion classification system of FIG. 9 may be obtained by referring to well-known emotion classification models, and may be divided into nine emotion categories including "neutral emotion", i.e., emotionless state.

Here, each emotion category may be divided into strong, medium, and weak in accordance with the emotion degree.

Next, in the sticker recommendation process, the server 10 may retrieve similar situations from the dialogue situation information database using the dialogue situation information of the analyzed utterance.

As shown in FIG. 5, the sticker recommendation process may include a similar situation retrieval process and a relationship and preference-based ranking determination process.

In the similar situation retrieval process, the most similar situation may be selected from utterance data that are already analyzed and stored based on the most probable dialogue act flow using the dialogue situation information.

Also, it may be determined whether an utterance starts a theme or corresponds to a response.

Each situation may be beforehand matched with sticker candidate groups according to whether an utterance starts a theme or corresponds to a response. In the preference-based ranking determination process, the ranking of the matched sticker candidate groups may be determined.

Appropriate stickers may be preferentially exposed according to the suitability based on the relationship with the other party, and may be preferentially exposed according to the suitability based on the preference of a user.

Figure 10:
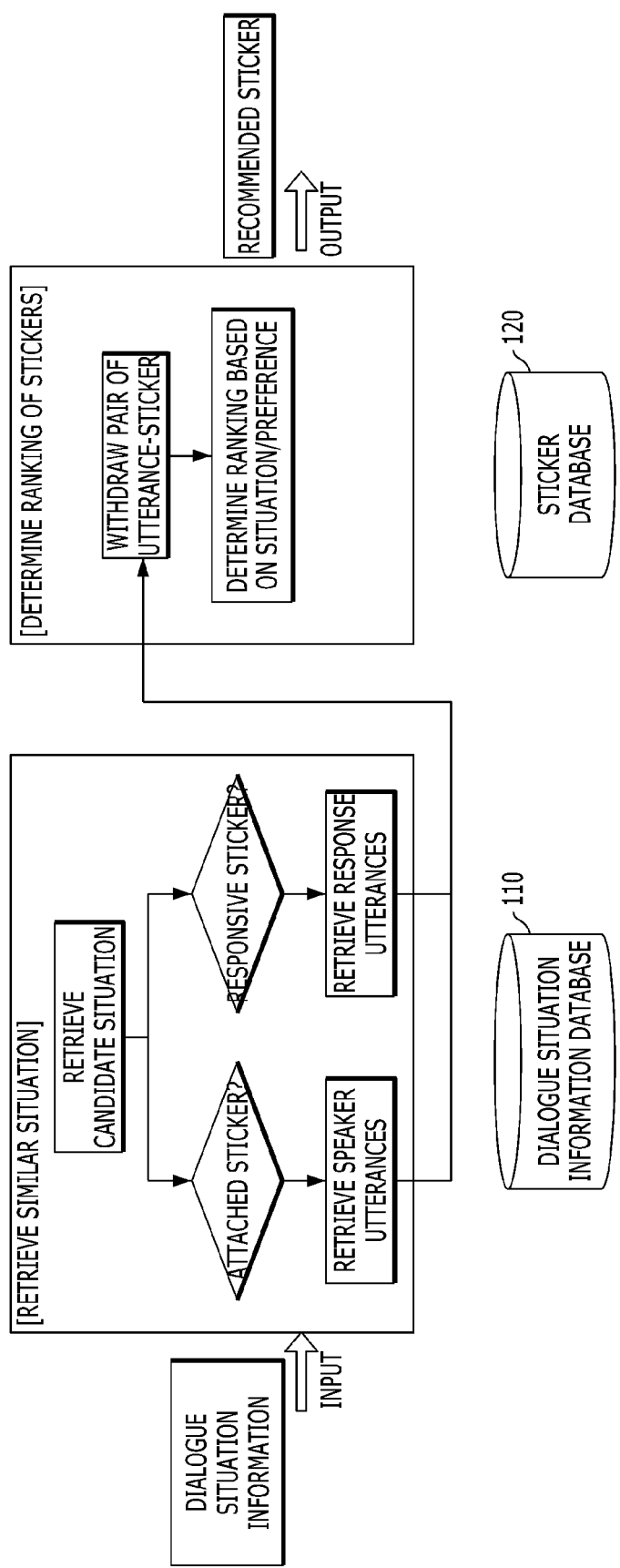
FIG. 10 is a view illustrating a sticker recommendation process.

Hereinafter, a sticker recommendation process will be described in detail with reference to FIG. 10.

When the surface analysis, the dialogue act analysis, and the emotion analysis on the last utterance between the first user and the second user are completed and the dialogue situation information is generated in the dialogue situation analysis process, the server 10 may retrieve a candidate situation from the dialogue situation information database.

Situations having the most probable flow of dialogue act may be arranged and ranked from the dialogue situation database that is already constructed through machine learning to a large amount of corpus.

Thereafter, the server 10 may determine whether the sticker to be recommended is an attached sticker or a responsive sticker.

When a sticker is recommended to the first user terminal 21, a different sticker may be recommended according to whether it is a turn for the first user terminal 21 to respond or an utterance starts a theme.

Thus, according to whether it is a turn for the first user to respond, speaker utterances or response utterances may be retrieved from the dialogue situation data base.

That is, among the utterances stored in the dialogue situation database, utterances starting a theme or responding utterances may be retrieved.

In a sticker ranking determination process, the server 10 may determine the ranking the retrieved utterances in consideration of the situation, the preference of a user and the relationship with the other dialogue party.

The utterances stored in the dialogue situation database may be stored in pairs of utterance-sticker, and the retrieval results may be corrected by determining the ranking of the pairs of utterance-sticker that are retrieved.

Hereinafter, a method of determining the ranking of dialogue stickers based on the situation and preference information according to an embodiment of the present invention will be described.

Figure 11:
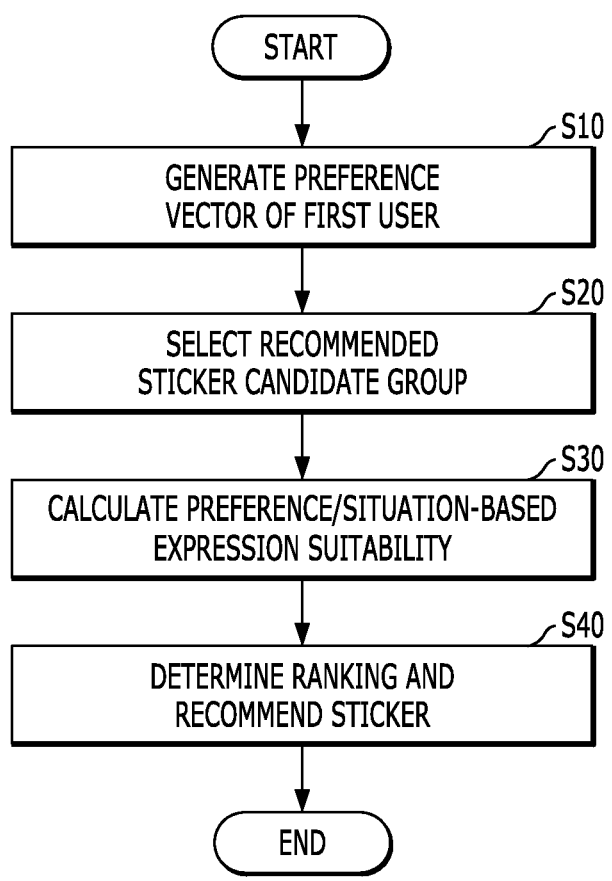
FIG. 11 is a view illustrating a method of determining the ranking of dialogue stickers based on situation and preference information according to an embodiment of the present invention.

FIG. 11 is a view illustrating a method of determining the ranking of dialogue stickers based on the situation and preference information according to an embodiment of the present invention.

As shown in FIG. 11, the server 10 may analyze utterances between the first user terminal 21 and the second user terminal 22 to select a sticker candidate group to be recommended to the first user terminal 21 (S20).

The selection process may be performed as described above.

Thereafter, the server 10 may calculate an expression suitability in regard to the selected sticker candidate group based on preference and situation information (S30).

Next, the ranking may be determined in the order of suitability, and then a higher ranked sticker may be recommended to the first user terminal 21 (S40).

Figure 12:
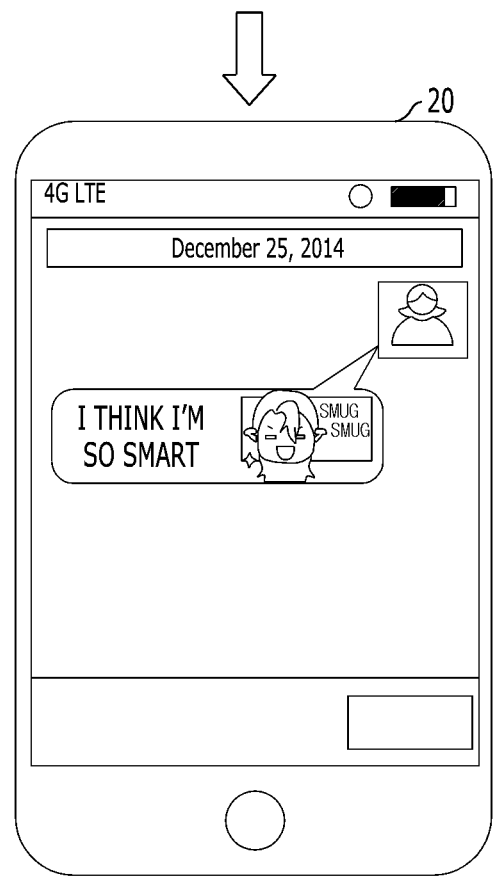
FIG. 12 is a view illustrating a process of recommending a highest-ranked sticker by determining the ranking of stickers according to a situation and preference.

As shown in FIG. 12, an utterance inputted by the first user may be analyzed, and two stickers "smug" and "conceited" may be selected as a sticker candidate group to be recommended in regard to the analyzed utterance.

As a result of determining the ranking of the stickers in accordance with the preference of the first user, it can be seen that "smug" having higher expression suitability is finally recommended from the sticker candidate group.

The expression suitability may be calculated based on the preference or situation.

1) Preference-Based Expression Suitability

Upon calculation of the preference-based expression suitability, a distance between an expression preference vector of the first user and an expression vector for each sticker may be calculated in regard to each sticker of the selected sticker candidate group.

For this, the server 10 may construct in advance the expression preference vector through machine learning to utterances of the first user.

The expression preference vector may be one-dimensional vector having n vector elements, and each vector element may correspond to a criterion for determining the preference for a sticker.

For example, a dynamic expression (p1), a complicated expression (p2), and an exaggerated expression (p3) may become vector elements.

Meanwhile, each sticker may have an expression vector that is a one-dimensional vector having the same vector elements as the expression preference vector. This expression vector may be assigned with a value in advance for each sticker stored in a sticker database 120.

The server 10 may extract an expression vector of a sticker mainly used by the first user from the utterances of the first user, and may determine the preferences for each vector element in order to store the preferences (S10).

For example, the average value for each vector element of the expression vector of stickers used for the last certain period may be used as the preference.

The collected expression preference vector of the first user may be expressed as (p1, p2, p3)=(0.7, 0.3, 0.2). (in this case, dynamic expression (p1), complicated expression (p2), exaggerated expression (p3)) The vector value may mean that the first user somewhat prefers dynamic expressions and does not prefer complicated expressions and exaggerated expressions more and more.

In operation S30, a distance between the expression preference vector of the first user which is collected in advance as above and the expression vector of each sticker pertaining to a recommended candidate group may be obtained.

The preference-based expression suitability may be in inverse proportion to the distance between the expression preference vector of the first user and the expression vector of each sticker pertaining to the recommended candidate group.

2) Situation-Based Expression Suitability

Upon calculation of the situation-based expression suitability, the server 10 may determine a similar situation to utterances of the first user terminal 21 and the second user terminal 22 from the dialogue situation information database 110, and may calculate a distance between the sticker expression preference vector of the determined similar situation and the expression vector of each sticker of the selected sticker candidate group.

A method of determining a similar situation will be separately described below.

The server 10 may collect expression vectors of stickers mainly used for each situation of the dialogue situation information database 110, and thus may calculate and store expression preference vectors for each situation.

Each situation of the dialogue situation information database 110 may include continuous utterances having stickers, and may include dialogue act information (dialogue act category) or emotion type and strength.

For example, situations showing certain dialogue act information may be all combined into a similar situation, and the expression vectors of each sticker from pairs of utterance-sticker included in the corresponding similar situation. Then, the expression preference vector for each situation may be obtained by, e.g., a method of taking an average thereof.

In operation S30, the server 10 may determine a similar situation to utterances of the first user terminal 21 and the second user terminal 22, and may calculate a distance between the situation expression preference vector of the corresponding similar situation and the expression vector of each sticker pertaining to the recommended sticker candidate group.

The situation-based expression suitability may be in inverse proportion to the obtained distance between the vectors.

The situation-based expression suitability may be the inverse number of the distance between the situation expression preference vector of the similar situation and the expression vector of each sticker pertaining to the recommended candidate group.

Naturally, stickers may be recommended to the first user terminal 21 in the order of high situation-based expression suitability.

Meanwhile, stickers used by users during the dialogue may slightly differ in accordance with the tendency of the other party.

That is, it cannot be seen that the expression suitability according to the context (situation) of dialogue or the personal disposition (preference) ensures optimal sticker recommendation in all cases.

Accordingly, when the expression suitability is calculated in operation S30, a correction may be needed in accordance with the relationship between the first user and the second user.

For this, the server 10 may first infer the relationship between the first user and the second user through the analysis of utterances between the first user terminal 21 and the second user terminal 22.

Then, the expression suitability may be corrected in accordance with the inferred relationship.

The relationship may have a value corresponding to the intimacy or relationship between subordinates and superiors. For example, "familiarity", "unfamiliarity", "superior", and "subordinate" may correspond to values that describe the relationship.

The relationship may be inferred in accordance with whether unceremonious words are used or whether honorific words or plain words are used, through the analysis of utterances between the first user terminal 21 and the second user terminal 22.

For example, when the intimacy is high, a tendency of using stickers showing somewhat dynamic, complicated, or exaggerated expression forms is observed. Accordingly, when the intimacy between the first user and the second user is high, the dynamic expression, complicated expression or exaggerated expression suitability of the expression vector for each sticker may be corrected so as to increase.

On the other hand, in case of a relationship between subordinates and superiors, a tendency of using stickers showing somewhat simple or unexaggerated expression forms is observed. Accordingly, when the second user is a superordinate to the first user and stickers are recommended to the first user, the dynamic expression, complicated expression or exaggerated expression suitability of the expression vector for each sticker may be corrected so as to decrease.

On the contrary, when the relationship is not a relationship between subordinates and superiors, the correction may not be separately needed.

Meanwhile, although it has been described that the expression suitability is determined based on the situation or preference and stickers are recommended in the order thereof, an actual algorithm may also be designed such that the expression suitabilities are calculated based on several criteria, and are be overall considered to recommend stickers.

In operation S30, a method of obtaining a recommendation score by substituting the preference-based expression suitability and the situation-based expression suitability for the selected sticker candidate group into a certain formula and recommending stickers in order of higher recommendation score may be used.

The formula for calculating the recommendation score may include the preference-based expression suitability and the situation-based expression suitability as operands, and a correction according to the relationship between users may be reflected in the formula. In addition, similarity between utterances and similar situations retrieved from the dialogue situation information database may also be converted into a numerical value so as to be included as an operand.

Meanwhile, a process of retrieving similar situation from the dialogue situation information database will be described in detail with reference to FIG. 13.

The similar situation retrieval process may be performed by retrieving situations having continuous utterances matching with the dialogue act flow of utterances of the first user terminal 21 and the second user terminal 22 and determining the ranking of candidate situations in accordance with the predefined dialogue act flow prediction criteria in regard to the retrieval result.

A dialogue situation information database 110 may store dialogue situation information on a plurality of continuous utterances through machine learning to a plurality of dialogue act attachment corpuses and emotion attachment corpuses, and in this case, the situation may include a plurality of continuous utterances. That is, this may mean a dialogue including a series of continuous utterances, not a single utterance.

Meanwhile, the plurality of continuous utterances stored in the dialogue situation information database 110 may include pairs of utterance-sticker. That is, the dialogue situation information database 110 may be constructed by analyzing corpuses in which a sticker has been used during a dialogue.

The server 10 may find the candidate situation having the most similar context, using the dialogue situation information on the last utterance.

In this case, the candidate situation having a flow corresponding to a series of dialogue act information included in the dialogue situation information of the last utterance may be retrieved.

Figure 13:
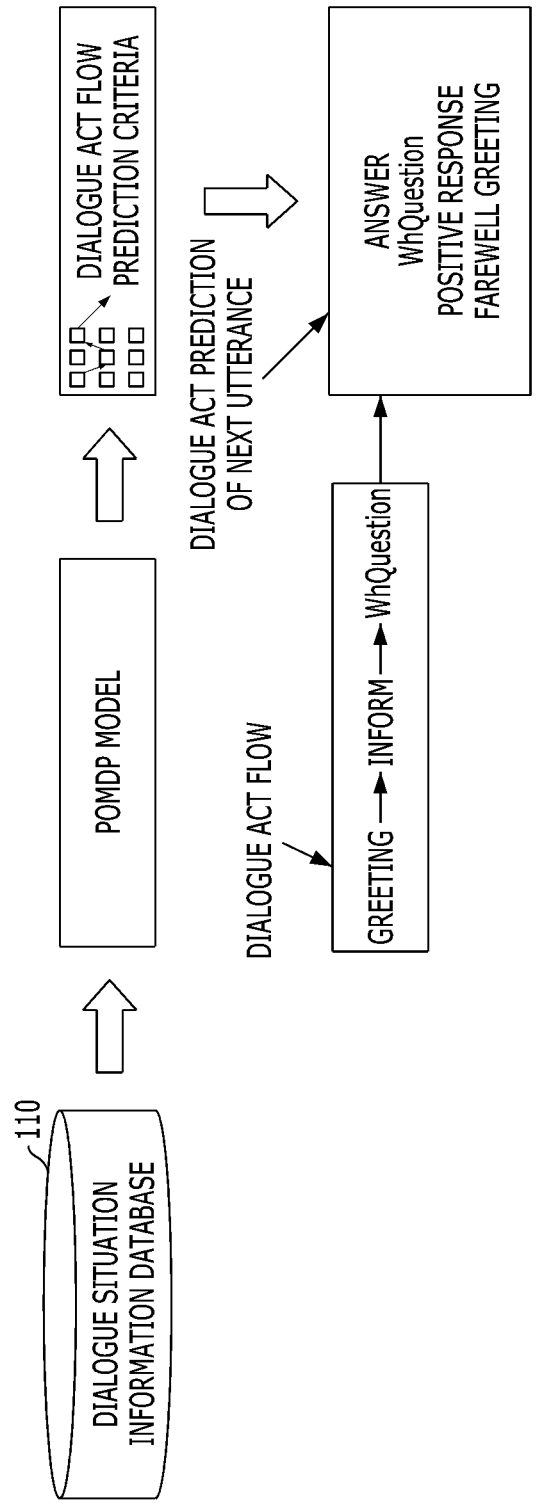
FIG. 13 is a view illustrating a process of retrieving similar situations from a dialogue situation information database and determining the ranking of the similar situations.

FIG. 13 is a view illustrating a process of determining the ranking of candidate situation in the order of the most probable dialogue act flow from a dialogue situation information database.

As shown in FIG. 13, the dialogue act category included in the dialogue situation information of the last utterance may be "greeting->inform->Wh-question".

Accordingly, the server 10 may retrieve, from the dialogue situation information database, a situation in which the dialogue act categories corresponding thereto are sequentially found, i.e., a candidate situation.

In this case, a plurality of candidate situations may be retrieved, but all candidate situations that are retrieved may not match with the dialogue situation of the first user and the second user.

Accordingly, the server 10 may determine the ranking of the candidate situation that are retrieved.

For this, dialogue act flow prediction criteria may be constructed in advance from the dialogue situation information database 110 the by a certain algorithm.

The dialogue act flow prediction criteria may be rules that define which dialogue act category will stochastically follow a specific dialogue act flow, and may be constructed through machine learning by a Partially Observable Markov Decision Processes (POMDP) algorithm.

For example, it may be inferred through machine learning to be able to describe which dialogue act category will follow "greeting->inform->Wh-question".

In the example of FIG. 13, "response" is most likely to follow "greeting->inform->Wh-question", and then it can be predicted that "Wh-question", "confirm response", and "farewell greeting" sequentially will occur.

According to these dialogue act flow prediction criteria, a plurality of candidate situations having a dialogue act flow like "greeting->inform->Wh-question" may be ranked.

That is, a candidate situation followed by a "response" dialogue act category thereafter may be top-ranked.

The method according to the embodiment of the present invention can also be embodied into a form of program instruction executable through various computer means, and can be recorded on computer readable media. The computer readable media may include program instructions, data files, data structures, or combinations thereof. The program instructions recorded in the media may be what is specially designed and constructed for the present invention, or may be what is well-known to computer software engineers skilled in the art. Examples of computer readable recording media include hard disk, magnetic media such as floppy disks and magnetic tapes, optical media such as CD-ROM and DVD, magneto-optical media such as floptical disk, and hardware devices such as ROM, RAM, and flash memory, which are specially configured so as to store and perform program instructions. Examples of program instructions may include high-level language codes which can be executed by computers using an interpreter and the like, as well as machine language codes which are made by a compiler.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

According to the embodiments, although an identical dialogue content or keyword is inputted, different stickers can be appropriately recommended in accordance with the dialogue context and situation. That is, compared to algorithms of automatically recommending a sticker through simple keyword matching, a more appropriate sticker can be recommended.

Particularly, stickers can be recommended similarly to a case where a user directly selects a sticker from various stickers, by determining the ranking of stickers and recommending a higher-ranked sticker by scoring the selected sticker candidates based on the relationship between dialogue parties, the situation-based expression suitability, and the preference of a user.

The present invention can be applied to social network service and messenger technical fields.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of recommending a dialogue sticker by use of a server that is connected to a first user terminal and a second user terminal through a network and relays an utterance inputted to a messenger between the first user terminal and the second user terminal, the utterance including at least one of a text and an image, the method comprising:
    analyzing a dialogue situation from utterances between the first user terminal and the second user terminal;
    selecting a sticker candidate group by retrieving a dialogue situation similar to the analyzed dialogue situation from utterance data;
    calculating, based on preference information, an expression suitability for each sticker of the selected sticker candidate group;
    ranking the stickers in the sticker candidate group based on the expression suitability; and
    recommending a highest ranked sticker on a display device of the first user terminal,
    wherein the step of calculating an expression suitability comprises calculating a distance between an expression preference vector of a first user of the first user terminal and an expression vector for each sticker of the selected sticker candidate group and
    wherein the expression vector for a sticker has multiple elements and each element of the expression vector has a value that indicates the first user's preference on the sticker in association with a type of expression.

2. The method of claim 1, before the step of calculating the expression suitability, further comprising: generating the expression preference vector of the first user by accumulating and analyzing the utterances of the first user terminal.

3. The method of claim 1, wherein the expression preference vector is one-dimensional vector having n vector elements, and each vector element is a criterion for determining the preference for a sticker.

4. The method of claim 3, wherein the vector element of the expression preference vector comprises at least one element of dynamic expression, complicated expression and exaggerated expression.

5. The method of claim 3, wherein the expression vector for each sticker is one-dimensional vector having the same vector elements as the expression preference vector.

6. The method of claim 1, wherein the type of expression is one of dynamic expression, complicated expression and exaggerated expression.

7. A non-transitory computer readable medium storing instructions for recommending a dialogue sticker by use of a server that is connected to a first user terminal and a second user terminal through a network and relays an utterance inputted to a messenger between the first user terminal and the second user terminal, the utterance including at least one of a text and an image, wherein execution of the instructions by a computing device causes the computing device to perform the steps of:
    analyzing a dialogue situation from utterances between the first user terminal and the second user terminal;
    selecting a sticker candidate group by retrieving a dialogue situation similar to the analyzed dialogue situation from utterance data;
    calculating, based on preference, an expression suitability for each sticker of the selected sticker candidate group; and
    ranking the stickers in the selected sticker candidate group based on the expression suitability; and
    recommending a highest ranked sticker on a display device of the first user terminal,
    wherein the step of calculating an expression suitability comprises calculating a distance between an expression preference vector of a first user of the first user terminal and an expression vector for each sticker of the selected sticker candidate group, and
    wherein the expression vector for a sticker has multiple elements and each element of the expression vector has a value that indicates the first user's preference on the sticker in association with a type of expression.

8. The non-transitory computer readable medium of claim 7, wherein the type of expression is one of dynamic expression, complicated expression and exaggerated expression.

* * * * *